Jan. 6, 1948.    H. P. VAN KEUREN    2,433,966
METHOD OF MAKING TUBULAR MEMBERS BY PROGRESSIVE HELICAL WELDING
Filed Dec. 16, 1943    3 Sheets-Sheet 1
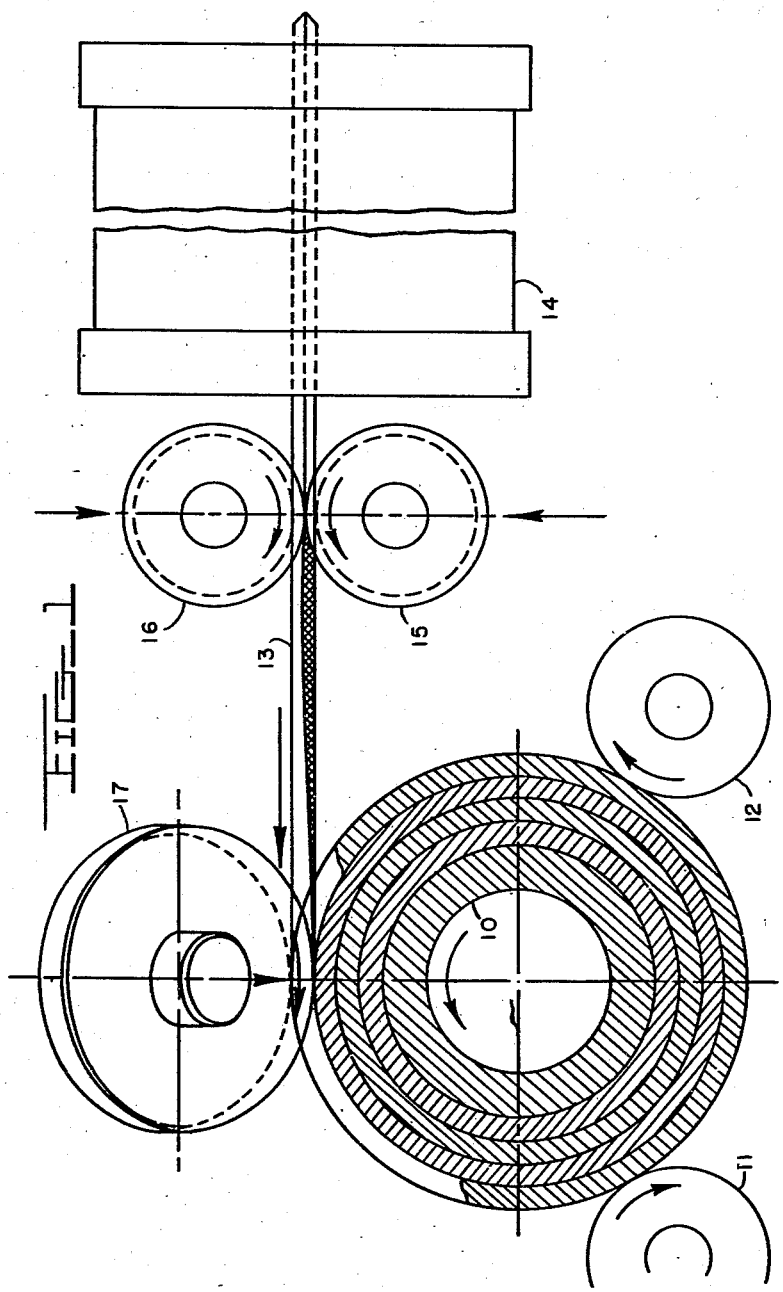
Inventor
HENRY P. VAN KEUREN DECEASED
MARIE S. VAN KEUREN ADMINISTRATRIX
By
Attorney

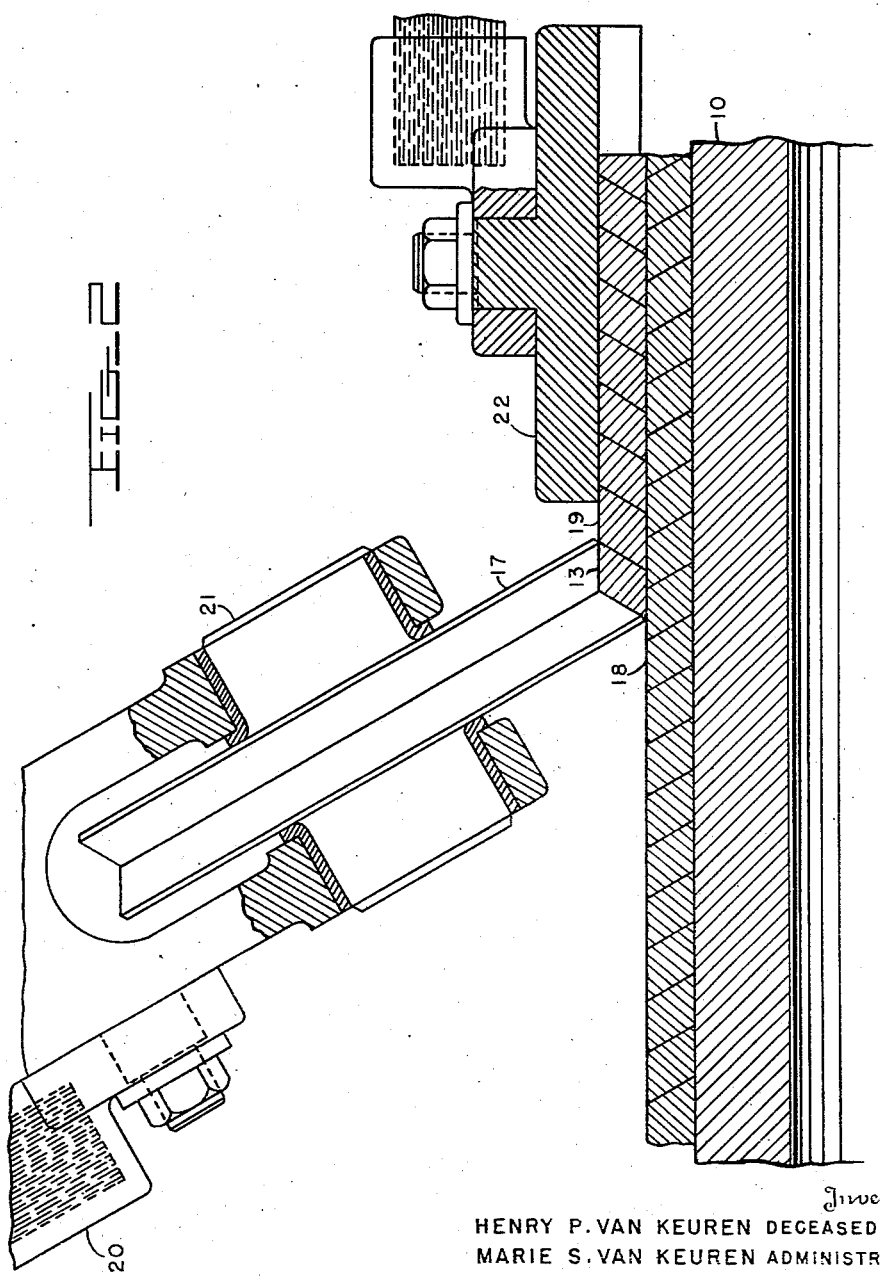

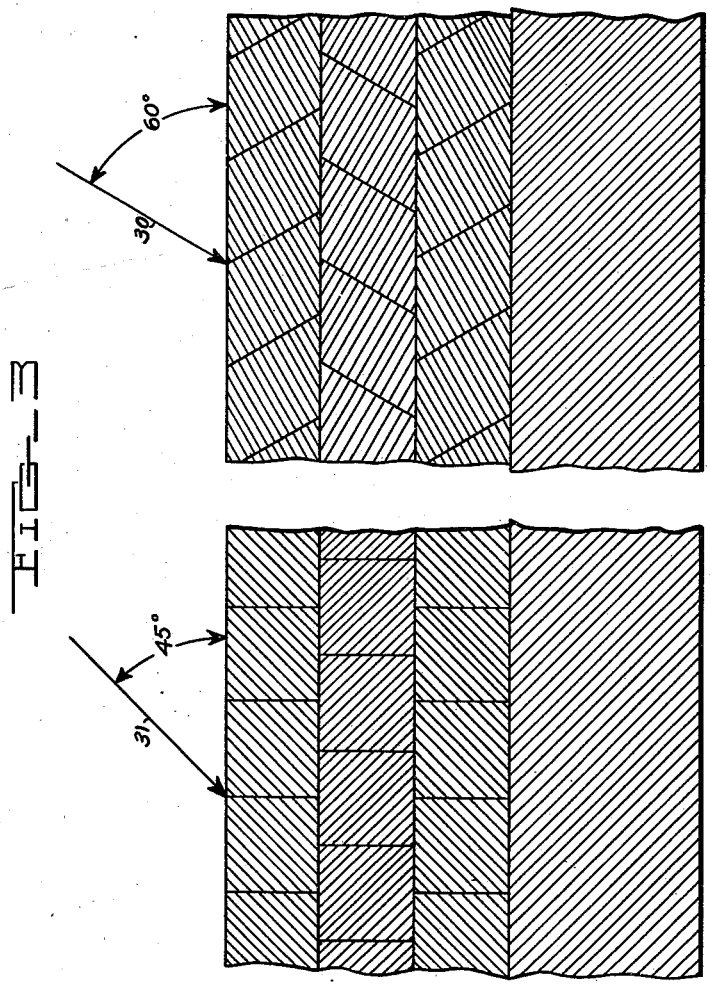

Patented Jan. 6, 1948

2,433,966

UNITED STATES PATENT OFFICE 2,433,966

METHOD OF MAKING TUBULAR MEMBERS BY PROGRESSIVE HELICAL WELDING

Henry P. Van Keuren, deceased, late of Bloomfield, Ohio, by Marie S. Van Keuren, administratrix, Bloomfield, Ohio Application December 16, 1943, Serial No. 514,554

7 Claims. (Cl. 219—10)

This invention relates to the art of making tubular members having unusual radial strength, and it is particularly directed to a method for manufacturing gun barrels.

The 37 millimeter anti-aircraft gun and up to the largest present sizes of such types of weapon are now made of centrifugal castings. The process of centrifugal casting is limited to the manufacture of guns of not over a 5 inch bore as an extreme, due to the length of the casting and inability to run the metal to such extreme lengths. Where forged blanks are used in place of castings, a considerable amount of time is lost in machining from the solid block. In the case of guns of larger caliber made of forgings by the built up method, an immense amount of metal removal and precision machine work is required within close tolerances to provide for the shrink fits necessary.

A number of years ago the wire-wound gun was developed and, on a weight basis, it was the strongest gun ever developed. It had one serious drawback, however, and it was abandoned largely because of this drawback, namely, the tendency of the gun to "droop" or the bore to get out of line, due to lack of beam strength, which followed from non-continuity of metal between adjacent strands of wire longitudinally of the gun. In other words there was no bond either between layers or between adjacent wires in the same layer. Attempts have been made to solder the adjacent turns together where a brass or copper alloy wire was used, such as in the days of brass cannon, but it is not practicable in the fabrication of the high power, alloy steel guns of today.

It is an object of the invention to provide a method of making tubular members of increased radial strength.

Another object includes a method of making steel gun barrels of any desired size, utilizing the principle of the wire-wound gun, but characterized in that the gun barrels so made have satisfactory beam strength and are free from the droop otherwise present in guns of the wire-wound type. Another object includes a method of making gun barrels and tubular members which is simpler and less costly in time and labor than conventional methods.

Other objects include the provision of tubular members of increased radial strength, and gun barrels of sufficient strength and rigidity as to compare favorably with guns made by the conventional casting and forging methods.

Other objects will be apparent from the following description, having reference to the accompanying drawing, in which:

Fig. 1 is a schematic diagram of the method of making the wrapped tubular members and guns of this invention, taken transversely through the tubular core 10;

Fig. 2 is a schematic diagram taken longitudinally through the tubular core 10 and showing in detail the placement of the turns of the wrapping as they are welded in place; and Fig. 3 is a cross-sectional view of part of a wrapped tubular member or barrel illustrating different types of wrapping.

Referring to Fig. 1 a tubular core 10, such as a seamless steel tube, either straight or tapered, is supported on rollers 11 and 12. A steel ribbon 13 with which the member 10 is to be wound is passed through a furnace 14 where it is preheated (e. g. to a red heat) to reduce the amount of heating required in the welding operation. The ribbon 13 passes between tension rollers 15 and 16, the roller 15 being knurled so as to scrape off foreign matter and to roughen the surface of the ribbon 13 to facilitate welding by increasing current density in spots and to start minute arcs just ahead of the point of pressure of roller 17. From the rollers 15 and 16 the hot ribbon 13 passes into contact with the core 10, or layers of ribbon previously applied under heavy pressure from a roller 17. The roller 17, in addition to placing the ribbon 13 against the core 10 or other layers, supplies an intense electrical current whereby the ribbon 13 is welded in the area of contact between its roughened side and the ribbon layer underneath. In this way a tubular member is built up in which the covering is rigid and is under circumferential tension (or radial compression) in the same way as a high caliber gun barrel.

In Fig. 2 the welding operation which takes place between the ribbon 13 and the underlying layers is shown in more detail. The ribbon 13 shown has a cross-section of a parallelogram and the pressure roller 17 forces the ribbon 13 simultaneously against the underlying layer 18 and the adjacent turn 19. Electric current is supplied to the roller 17 through a cable 20 which is connected to the bearing 21 of the roller 17. The other electrical connection is made by means of a shoe 22 which slides in contact with the surface formed by the turns of the ribbon 13 and follows right behind the roller 17.

In order that the ribbon 13 will be wound under tension, it is necessary to provide means for rotating the core 10 against the drag of the tension rollers 15 and 16. For this purpose any large lathe, the headstock of which is capable of grasping one end of the tubular core 10, and of subsequently holding the thicker, wrapped end of the tubular member of the gun barrel, is satisfactory. The method of turning large cylinders against a torsional load is well understood in the art.

It is not necessary that an oblique ribbon be used in the formation of the tubular members and gun barrels described. For example, a square or rectangular ribbon may be used, and cross-sections of parts of two gun barrels made from two different types of ribbon are shown in Fig. 3. Also shown by means of arrows 30 and 31 is the direction in which the roller 17 presses the ribbon against the core 10, or underlying layers, and the adjacent turn. The angles shown are, of course, only approximate and are not at all critical. Any practicable shape of wire or ribbon which may be readily drawn or rolled and which may be wound, as laid, without voids may be used, and the heavier the ribbon, within limits, the more rapid will be the process of building the gun barrel up to a definite size.

In the actual welding, the surface of the ribbon 13 and of the metal to which it is to be welded may be further preheated by means of a flame (or other source of intense heat) at a point just ahead of the weld to insure the best type of weld. However, for guns, the welds need not be perfect because the longitudinal stresses are low, and the gun does not require solid metal to prevent droop.

As a result of the above process, gun barrels or other tubular members of the kind described may be produced rapidly on relatively crude winding machines made out of lathes, new or old. No great precision is required in the winding and machines may even be largely improvised of structural steel.

In cooling, the hot wire sets up shrinkage stresses similar to those obtained by shrink fits in the present types of built-up guns, but all precision machine work between components of existing built-up guns are eliminated, leaving only exterior, interior, breach and muzzle surfaces to finish as required.

Many variations will be apparent to those skilled in the art and the invention should not be limited other than as defined by the appended claims.

What is claimed is:

1. Method of making a tubular member characterized by its relatively great radial strength compared to its weight which comprises wrapping a metal tube with a metal ribbon under pressure and progressively resistance welding the ribbon to said tube and to the adjacent previously welded turn of ribbon as the ribbon is wound into place.

2. Method of making a tubular member characterized by its relatively great radial strength compared to its weight which comprises helically winding in layers upon a metal tube a metal ribbon having sides conforming in shape to those of adjacent turns in the layer and to the underlying surface, thereby to eliminate voids, applying pressure to said ribbon as it is wound to press it simultaneously against said underlying surface and the adjacent turn and simultaneously progressively joining said ribbon to said underlying surface and to said adjacent turn by resistance welding at the point of applied pressure.

3. Method of making gun barrels which comprises wrapping a steel tube with a steel ribbon under pressure and progressively resistance welding the ribbon to said tube and to the adjacent previously welded turn of ribbon as the ribbon is wound into place.

4. Method of making gun barrels which comprises helically winding in layers upon a steel tube a steel ribbon having sides conforming in shape to those of adjacent turns in the layer and to the underlying surface, thereby to eliminate voids, applying pressure to said ribbon as it is wound to press it simultaneously against said underlying surface and the adjacent turn and progressively joining said ribbon to said underlying surface and to said adjacent turn by resistance welding at the point of applied pressure as the ribbon is wound into place.

5. The method of making a tubular member characterized by its great radial strength, which comprises wrapping a metal tube with a metal ribbon under pressure and progressively resistance welding the turns of said ribbon to said tube and to each other at the point where the ribbon first contacts the tube and the previously wound convolution in a continuous seam as the ribbon is wound into place.

6. The method of making a tubular member characterized by its great radial strength compared to its weight which comprises, helically winding in layers upon a metal tubular core a metal ribbon having sides conforming in shape to those of adjacent turns in the layer and to the underlying surface thereof, thereby to minimize voids, applying pressure to said ribbon as it is wound to press it simultaneously against the underlying surface and the adjacent turn to effect initial contact and progressively resistance welding said ribbon to said underlying surface and to said adjacent turn at the point of initial contact in a continuous seam as the ribbon is wound into place.

7. The method of making tubular members which comprises wrapping a steel tube with a steel ribbon under pressure and progressively welding the turns of said ribbon to said tube and to the adjacent previously welded turn in a continuous seam as the ribbon is wound into place.

MARIE S. VAN KEUREN,
*Administratrix of the Estate of Henry P. Van Keuren, Deceased.*

REFERENCES CITED

The following references are of record in the file of this patent:

UNITED STATES PATENTS

| Number | Name | Date |
| --- | --- | --- |
| 13,984 | Griffen | Dec. 25, 1855 |
| 412,363 | Brown | Oct. 8, 1889 |
| 417,800 | Webb | Dec. 24, 1889 |
| 486,624 | Burton et al. | Nov. 22, 1892 |
| 666,450 | Wilson | Jan. 22, 1901 |
| 1,323,621 | Edwards | Dec. 2, 1919 |
| 1,665,851 | Harris | Apr. 10, 1928 |
| 2,025,741 | Hansen | Dec. 31, 1935 |

Certificate of Correction

Patent No. 2,433,966.  January 6, 1948.

HENRY P. VAN KEUREN

It is hereby certified that the address of the deceased inventor and of the administratrix in the above numbered patent were erroneously described and specified as "Bloomfield, Ohio" whereas said address should have been described and specified as *Bloomville, Ohio*; and that the said Letters Patent should be read with these corrections therein that the same may conform to the record of the case in the Patent Office.

Signed and sealed this 25th day of May, A. D. 1948.

[SEAL]

THOMAS F. MURPHY,
*Assistant Commissioner of Patents.*